United States Patent [19]

Driessen et al.

[11] Patent Number: 5,037,660
[45] Date of Patent: Aug. 6, 1991

[54] PRODUCT AND METHOD OF MAKING A FERMENTED MILK PRODUCT

[75] Inventors: Francisus M. Driessen, Bennekom; Petrus B. G. Kluts; Jacob Knip, both of Woerden, all of Netherlands

[73] Assignee: Melkunie Holland B.V., Netherlands

[21] Appl. No.: 264,152

[22] Filed: Oct. 28, 1988

[30] Foreign Application Priority Data

Nov. 12, 1987 [NL] Netherlands ............ 8702710

[51] Int. Cl.⁵ .................................. A23C 9/13
[52] U.S. Cl. ............................. 426/43; 426/61;
426/71; 426/409; 426/519; 426/583; 426/580
[58] Field of Search ............ 426/43, 61, 71, 583, 426/409, 519

[56] References Cited

U.S. PATENT DOCUMENTS

| | | | |
|---|---|---|---|
| 3,924,007 | 12/1975 | Driessen et al. | 426/61 |
| 4,110,476 | 8/1978 | Rhodes | 426/583 |
| 4,382,097 | 5/1983 | Vedamuthu et al. | 426/43 |
| 4,435,432 | 3/1984 | Klupsch | 426/583 |
| 4,720,390 | 1/1988 | Bächler et al. | 426/583 |
| 4,748,026 | 5/1988 | Keefer et al. | 426/43 |
| 4,816,266 | 3/1989 | Rowat | 426/61 |

FOREIGN PATENT DOCUMENTS 0154614 8/1988 European Pat. Off. .

OTHER PUBLICATIONS

NIZO-Mededelingen No. 7, pp. 51–56 (1973) by Radema et al., "Verdikkingsmiddelen voor Yoghurt" (with translation).
NIZO-Mededelingen No. 7, pp. 15–33 (1973) by Galesloot et al., "Voortgezette Onderzoekingen Over de Consistentie van Yoghurt" (with translation).
NIZO-Mededelingen No. 7, pp. 57–62 (1973) by Galesloot et al., "Handhave van de Slijmstofproduktie van Yoghurtculturen" (with translation).
NIZO-Mededelingen No. 7, pp. 34–43 (1973) by Steenbergen et al., "Beschadiging van de Structuur van Yoghurt bij Transport Door een Vullijn" (with translation).
J. Rasic et al., "Yoghurt", vol. 1, pp. 154–156, Tech. Diary Publish. House (1978).
Journ. of Dairy sci., vol. 67, No. 1, pp. 1–6, Gilliland et al., "Effect of Viable Starter Culture Bacteria in Yoghurt on Lactose Utilization in Humans" (1984).
Food Sci. & Tech. Abstracts No. 85-05-P0026, Krishna et al., "Yoghurt from Whey Based Reconstituted Milk", pp. 48–49 (1984).

Primary Examiner—Marianne Cintins
Assistant Examiner—Helen Pratt
Attorney, Agent, or Firm—Webb, Burden, Ziesenheim & Webb

[57] ABSTRACT

The invention comprises a method for structuring of fermented milk products, wherein a starting milk having a fat content of at least 1 to 40% by weight, after standardization of the fat and dry solids content, is pasteurized and homogenized and fermented in the absence of binders or slime formation, wherein a coagulum of the fermented and not yet cooled product, which depending on the fat content may or may not contain added fat-free dry milk solids, is subjected to a controllable shearing force or energy dissipation, as a result of which slightly viscous characteristics result (which, after a period of standing, change to highly viscous characteristics), and to cooling to 10° C. or less with subsequent filling of containers with the product so formed.

14 Claims, 1 Drawing Sheet

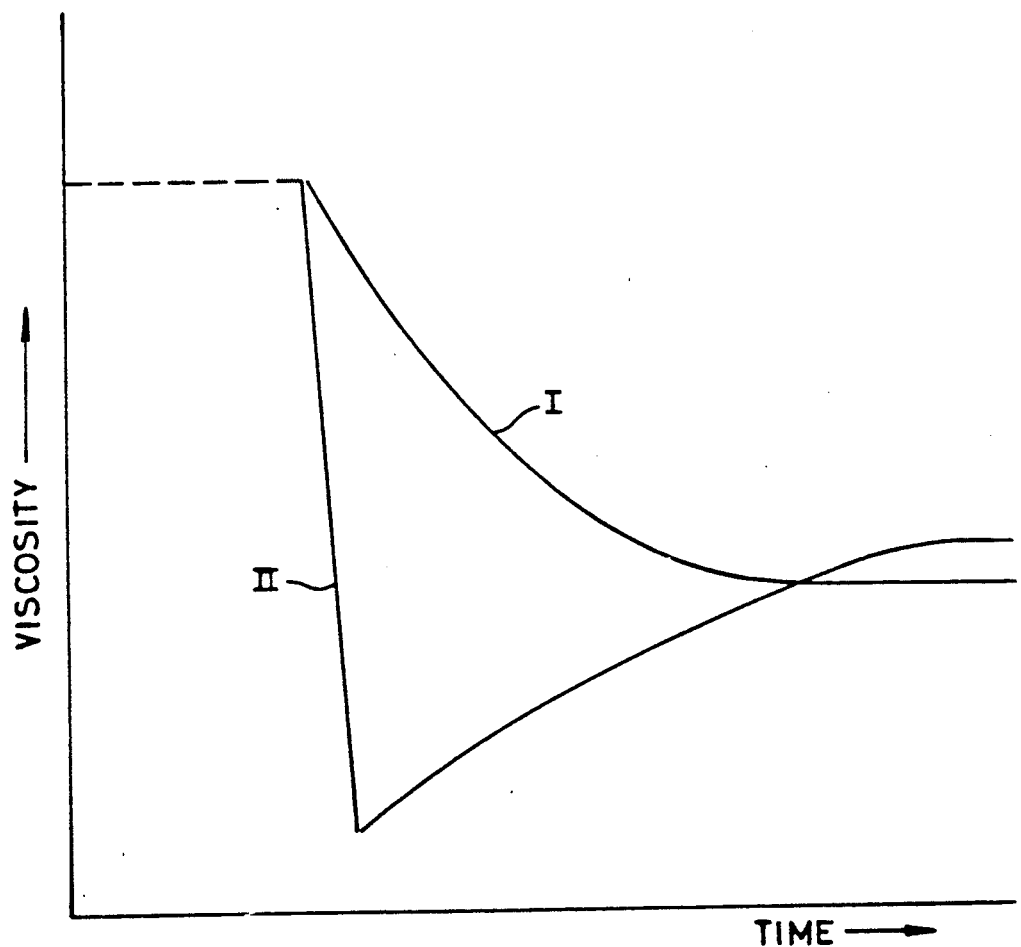

PRODUCT AND METHOD OF MAKING A FERMENTED MILK PRODUCT

The invention relates to structured, fermented milk products having a fat content of 1 to 40% by weight packed in containers and a method for their preparation.

In this context fermented milk products are understood to be whole yoghurt and low fat yoghurt, Biogarde ®, sour cream, sour whipped cream and sour semi cream each with its respective specifications.

When preparing yoghurt the aim is to obtain an end product which is not too thin. This can be achieved by subjecting the milk to an appropriate treatment and using cultures well suited for the purpose. However, as a consequence of the use of new packaging methods, yoghurt is subjected to mechanical processing more than in the past, with the consequence that it becomes thinner. Mixing of yoghurt with fruit also has an adverse effect on the viscosity. To bring about improvement here, thickening agents foreign to milk have frequently been incorporated up to now.

There are countries where the use of thickening agents foreign to milk is not permitted in the preparation of thickened yoghurt, yoghurt and low fat yoghurt.

However, if thickening agents foreign to milk are used, a choice is usually made from: pectin, agar agar, carrageen, sodium alginate, gelatine, tragacanth, carob bean flour, guar flour and sodium carboxymethylcellulose (CMC).

It can be seen from the publication by Radema and Van Dijk in NIZO-Mededeling (NIZO information sheet) no. 7, pages 51-56, (1973), that of the above mentioned thickening agents foreign to milk only agar agar, gelatine, tragacanth and amylopectin are suitable for use in yoghurt. In addition sodium caseinate can also be used.

It was also found from the study by Radema and Van Dijk that by the addition of skimmed milk powder to yoghurt milk a yoghurt is formed which has a more acid taste than comparable yoghurt which was prepared from normal milk, while when sodium caseinate is used the yoghurt acquired a somewhat milder taste.

In the publication by T. E. Galesloot and F. Hassing in NIZO Mededeling (NIZO information sheet), No. 7, 15-33 (1973) it is disclosed that coagulated yoghurt which has not yet been stirred forms a three-dimensional structure, the firmness of which is determined by the strength and the number of the mutual bonds between the constituents of the yoghurt (small spheres of fat and protein particles). Although the firmness of yoghurt is a characteristic which used to be considered more important for set yoghurt in The Netherlands than it is today, there is still some point in paying attention to the firmness of the yoghurt because this is associated with other characteristics which are still important now.

The firmness must be determined in a highly standardized manner because otherwise the results cannot be compared with one another. With the method used by Galesloot and Hassing one and the same sphere is always used and the depth to which this penetrated into the yoghurt in a given time was determined. The firmness is always given as 100 divided by the penetration depth of the sphere in cm. The measurement temperature is 18° to 19° C. In the present application use was made of a Sommer & Runge (Berlin) penetrometer and a Stevens-LFRA texture analyzer for measurement of the firmness.

With regard to "viscosity after stirring" it is pointed out that if coagulated yoghurt is stirred the fat/casein structure of the coagulated milk is broken down into small flakes and after some time a homogeneous fluid of high viscosity is formed. The high viscosity is determined by the number and the size of the flakes and in particular also by the degree to which the latter retain the serum of the milk. The greater the amount of moisture between the flakes, the easier the fluid flows. All of these factors are highly dependent on the intensity of stirring, i.e. the greater the latter, the smaller will be the flakes and the more moisture which will leave the flakes.

It can also be seen from the publication by Galesloot and Hassing that yoghurt which was prepared at a certain temperature and with a given culture exhibits a fairly close relationship between the firmness before stirring and the viscosity thereafter. The greater the firmness, the greater the viscosity is also found to be.

One of the causes of this phenomenon could be a slight tendency to loss of moisture from the flakes which originate from a strong structure. The fact that certain cultures produce bacterial slime which does not contribute to the firmness but does contribute to the viscosity can also play a role. The production of this slime substance is determined not only by the nature of the culture but also by the culture temperature. The formation of slime substance increases at lower culture temperatures. The slime is probably a polysaccharide by nature and acts as a thickener produced by the bacteria which ensures, inter alia, that the flakes retain their moisture better. Yoghurt which is prepared with cultures which produce slime has a beautiful smooth appearance after stirring and does not suffer from whey separation. The use of slime-producing cultures has made possible the preparation of stirring yoghurt such as is currently popular in The Netherlands. When these cultures are used, the yoghurt can be stirred before it has cooled without this resulting in coarse clotting and whey separation. A disadvantage of slime-containing fermented milk products is that the slime substances mask the original acid taste and the aroma.

The publication by Steenbergen in NIZO-Mededeling (NIZO information sheet) no. 7, 34-43 (1973) teaches that yoghurt consists of a network of protein chains and slime which has grown in and through one another in the fluid. As long as these chains are still entangled in one another, the fluid exhibits viscous flow and the viscosity is high. However, when the connection is broken the viscosity falls. This occurs when layers of yoghurt shift along one another. It is pointed out that at a certain flow rate the viscosity of yoghurt no longer falls after some time. It appears that certain structures are strong enough to withstand the shear forces which arise.

Steenbergen concludes that it is obvious that an attempt will be made to prepare yoghurt very carefully, so that a high initial viscosity and also a high resistance to damage are obtained. The author of this article emphasizes that the damage to the structure of yoghurt already starts when stirring in the culture tank to obtain a smooth texture. Therefore, this can best be carried out with the aid of a stirrer with large stirrer blades rotating at slow speed. The stirring time may not be longer than is strictly necessary.

According to Steenbergen transitions in the diameter of the transport lines must be avoided. The form of the construction is not very important, but the degree of constriction is decisive. It is therefore also important to ensure that shut-off valves are not in the half-opened position.

Drawbacks of the known products are that they have to contain added binders foreign to milk, binders formed by slime-forming lactic acid bacteria and/or a considerable amount of added fat-free dry milk solids if they are to have a desired viscosity and firmness.

As already stated, the addition of binders foreign to milk is not permitted in all countries, the polysaccharides formed by slime-forming lactic acid bacteria mask the taste and the addition of fat-free dry milk solids make the product expensive.

Surprisingly, it has now been found that the desired high viscosity of fermented milk products can be achieved not only by retaining the existing structure as far as possible but also by a controllable change in the three-dimensional structure of the coagulum, which results in a rearrangement of the fat/casein structure. This means that the coagulated milk product is brought via an intermediate phase to the desired high viscosity, specifically from a coagulum via a not very high viscosity to the desired high viscosity. While the viscosity curve for the known preparation of yoghurt according to Steenbergen can be represented by curve I in the appended figure, the viscosity curve for the preparation of yoghurt according to the invention can be represented by curve II in this figure.

The broken line indicates coagulum which has not yet been stirred.

The method according to the invention therefore consists in that, for the preparation of structured, fermented milk products, starting milk with a fat content of at least 1 to 40% by weight is, after standardization of the fat and dry solids contents, pasteurized and homogenized, mixed cultures of micro-organisms in liquid, frozen or freeze-dried form are added in the customary percentages and the mixture is incubated for a predetermined period in a temperature range which is suitable for the aroma development and coagulum formation by the particular the mixture is then cooled to 10° C. or less and is filled into containers; the method is characterized in that non-slime-forming lactic acid bacteria are used as mixed cultures or slime-forming lactic acid bacteria are used which are incubated at temperatures at which the slime formation is minimal and the coagulum of the fermented and not yet cooled product, which depending on the fat content may or may not contain added fat-free dry milk solids, are subjected to a controllable shearing force, as a result of which slightly viscous characteristics result which, after a period of standing, change to highly viscous characteristics.

Thus, packed, structured, fermented milk products with a fat content of 1 to 40% by weight can be obtained which, at a fat content of 1% by weight to at least 4% by weight, contain an added percentage of fat-free dry milk solids which decreases linearly from 3 to 0% by weight as the fat content of the products increases from 1 to 4% by weight (and higher) and which are also free from other added binders and also from binders formed by slime-forming lactic acid bacteria. Structured, fermented milk products, packed in containers, according to the invention with a fat content of 4 to 40% by weight therefore do not need to contain any added fat-free dry milk solids.

In this context fat-free dry milk solids are understood to mean not only the totally fat-free dry milk solids but also caseinates not only the totally fat-free dry milk solids but also caseinates and whey protein preparations. If caseinates and whey protein preparations are used, the percentages indicated must, of course, be adjusted.

The method according to the invention can be carried out either continuously or batchwise. Ways in which a controllable shear force can be exerted are, inter alia, to feed the yoghurt through a reducing valve, through a channel, through a sieve or through a pipeline in which there is a rotating stirrer.

Similar products to those prepared according to the invention are available commercially but, as already mentioned, these differ from the products in question in that they contain other added binders, polysaccharides formed by slime-forming lactic acid bacteria and/or a quantity of added fat-free dry milk solids which does not decrease linearly from 3 to 0% by weight as the fat content increases from 1 to 4% by weight. Examples of such commercially available products are given in Table A.

Milk contains on average 3.36% by weight and skimmed milk powder 36% by weight protein. By addition of skimmed milk powder fat-free dry solids: ffds) the protein content of the products is increased. This can be seen in the composition given for a number of products which are relevant within the scope of the present patent application and which were obtained by purchasing from the market. The percentage added ffds was determined by calculation. These data are given in Table A.

TABLE A

| Product | Manufacturer + sell-by date | Indicated % by weight fat | Indicated % by weight protein | Calculated % by weight extra ffds | (invention) |
|---|---|---|---|---|---|
| Biogarde | Almhof/CEMA 19.06.87 | 3.5 | 4.8 | 4.0 | (0.5) |
| Biogarde | MONA 28.06.87 | 1.5 | 4.4 | 2.9 | (2.5) |
| Biogarde | Danône 27.06.87 | 1.5 | 4.55 | 3.3 | (2.5) |
| Bioculture | Menken 17.06.87 | 1.5 | 4.5 | 3.2 | (2.5) |
| Yoghurt | Stassano 16.09.87 | 3.0 | 4.0 | 1.8 | (1.0) | code c: ffds

From the composition of the products shown Table A it can clearly be seen that the percentages fat-free dry milk solids have been increased by the addition of fat-free dry milk solids.

EXAMPLE IA, IB, IC

Preparation of yoghurt 45 grammes skimmed milk powder per portion were added to 3 4.5 liter portions of milk with a fat content of 3.05% by weight. The mixtures were warmed to 65° C., with stirring, homogenized under a pressure of 20 MPA then further heated to 90° C. and kept at this temperature for 10 minutes. The portions of milk were then cooled to 32° C., 37° C. and 43° C. respectively. 225, 112 and 112 grammes respectively of fresh, non-slime-producing yoghurt culture consisting of *L. delbrueckii* subsp. *bulgaricus* and *S. thermophilus* were added per portion of milk and the mixture stirred for 10 minutes. The portions of milk were incubated at the said temperatures for 7, 4.5 and 3 hours respectively until a pH of 4.4 was reached. The coagulums formed were then subsequently stirred loose with the aid of a propeller stirrer for 2 minutes at a speed of 250 revolutions per minute. With the aid of a lifting pump (type Waukesha, 3D0, delivery 30 liters per hour), the coagulums were pumped through two sieves. The first sieve consists of a perforated plate with a diameter of 25 mm provided with 42 circular perforations, per cm2, with a diameter of 0.55 mm. The second sieve consisted of metal gauze with a diameter of 25 mm, with a mesh width of 0.4 mm and a wire thickness of 0.2 mm. The preparation conditions are given in Table B.

The sieved yoghurts were collected in 500 ml plastic beakers, closed off with an aluminium capsule and then cooled to 7° C. in a forced stream of air at 4° C.

After storing for 1 day and for 2 weeks at 7° C., the pH and the flow-through time of the 3 portions of yoghurt were measured at 7° C., the flow-through time being measured with the aid of a Posthumus funnel with an outlet orifice with a diameter of 8 mm. The portions of yoghurt were also assessed organoleptically at these times.

The yoghurt which was cultured at 32° C. has a flow-through time of 50 seconds after storing for 1 day and 54 seconds after storing for 2 weeks. The pH at said times was 4.14 and 3.91 respectively. After storing for 1 day the product had a good yoghurt consistency and taste. After storing for 2 weeks the product had hardly changed and retained its smooth, thick consistency and clean yoghurt taste.

The yoghurt which was cultured at 37° C had a flow-through time of 60 seconds after storing for 1 day and 67 seconds after storing for 2 weeks. The pH at said times was 4.12 and 3.91 respectively. After storing for 1 day, the product had a good yoghurt consistency and taste. After storing for 2 weeks, the product had hardly changed and retained its smooth, thick consistency and clean yoghurt taste.

The yoghurt which was cultured at 43° C. had a flow-through time of 156 seconds after storing for 1 day and of 166 seconds after storing for 2 weeks. The pH at said times was 4.07 and 3.88 respectively. After storing for 1 day, the product had a good yoghurt consistency and taste. After storing for 2 weeks the product had hardly changed and retained its smooth, very thick consistency. Despite this very thick consistency the product retained a clean yoghurt taste.

TABLE B

| Example | Preparation of | Starting milk in liters | Fat in wt. % of starting milk | SNF in weight % | Added skim milk powder (in % calculated on the starting milk) | First heating step in °C. | Homogenization pressure in MPa | Second heating step in °C. | Period of second heating step in min. | Incubation temperature |
|---|---|---|---|---|---|---|---|---|---|---|
| IA | yoghurt | 4,5 | 3,05 | 7 | 45 (1) | 65 | 20 | 90 | 10 | 32 |
| IB | yoghurt | 4,5 | 3,05 | 7 | 45 (1) | 65 | 20 | 90 | 10 | 37 |
| IC | yoghurt | 4,5 | 3,05 | 7 | 45 (1) | 65 | 20 | 90 | 10 | 43 |
| II | yoghurt | 100 | 10,1 | 7,0 | — (0) | 65 | 20 | 92 | 6 | 43 |
| III | yoghurt | 120 | 4,09 | 8,43 | — (0) | 65 | 20 | 92 | 6 | 43 |
| IV | yoghurt | 50 | 1,5 | 7 | 1000 (2,0) | 65 | 20 | 90 | 10 | 43 |
| V | yoghurt | 100 | 2,9 | 7 | 1000 (1,0) | 65 | 20 | 92 | 6 | 43 |
| VI | yoghurt | 100 | 2,93 | 7 | 1000 (1,0) | 65 | 20 | 92 | 6 | 43 |
| VII | yoghurt | 100 | 2,93 | 7 | 1000 (1,0) | 65 | 20 | 92 | 6 | 43 |
| VIII | yoghurt | 100 | 2,93 | 7 | 1000 (1,0) | 65 | 20 | 92 | 6 | 43 |

| Example | Added non slime-forming culture | Amount of culture added in g. and % | Stirring period in min. | Incubation period at chilling temperature in hours | Incubation till pH | Structuring unit | dP kPa | Before chilling | Deep chilling |
|---|---|---|---|---|---|---|---|---|---|
| IA | L. delbrueckii subsp. bulgaricus S. thermophilus | 225 (5) | 10 | | 4,4 | 2 sieves | | | in breaker from culture temp. |
| IB | idem | 112 (2,5) | 10 | 4,5 | 4,4 | idem | | | |
| IC | idem | 112 (2,5) | 10 | 3 | 4,4 | idem | | | |
| II | idem | 2500 (2,5) | 5 | 5 | 4,4 | slant, 0,2-25 | 500 | 20° C. | pipes |
| III | idem | 3000 (2,5) | 5 | 4,25 | 4,4 | slant, 0,4-30 | 50 | 20° C. | pipes |
| IV | idem | 1250 (2,5) | 5 | 3,2 | 4,37 | 2 sieves | 7 | 18° C. | in beaker |
| V | L. delbrueckii subsp. bulgaricus S. thermophilus | 2500 (2,5) | 2 | 5,25 | 4,34 | valve | 25 | | in plate chiller till 10° C. |
| VI | idem | 2500 | 5 | 5,25 | 4,24 | valve | 50 | 15° C. en 25° C. | in beaker |
| VII | idem | 2500 | 5 | 5,25 | 4,24 | valve | 50 | 25° C. | mouth pipe |
| VIII | idem | 2500 | 5 | 5,25 | 4,24 | valve | 50 | 25° C. | mouth 0-5h |

(1) dimension slant: l × b × h = 0,2 × 25 × 25
(2) dimension slant: l × b × h = 0,4 × 30 × 25

EXAMPLE II

As Example I except that the quantity of starting milk, the fat content and fat-free dry solids content of the starting milk, the temperature in the second heating step, the duration of the second heating step, the temperature to which the product is cooled, the quantity of microbiological culture added, the stirring time and the incubation time are as indicated in the above Table B.

The coagulum was stirred loose with the aid of a spiral stirrer for 2 minutes at 60 revolutions per minute. During further processing the product was stirred slowly to maintain a homogeneous distribution. With the aid of a monopump (type SH 22R5, delivery 180 liters per hour), the product was pumped through a rectangular channel made of stainless steel, the dimensions of which are given in the table. This also applies for the pressure drop and the temperature to which the product is cooled. The pressure drop over the plate condenser was 150 KPA. The yoghurt, flowing with the aid of a lifting pump (type Waukesha, 3DO, delivery 30 liters per hour), was then cooled to 10° C. with the aid of a tube condenser and ice water at 2° C. The tube condenser consisted of two tubes, each with a length of 2 m and a diameter of 25 mm. The cooled yoghurt was collected in plastic beakers, closed off with an aluminium capsule and stored at 7° C.

The penetration depth, determined with the penetrometer, of this product, was 5.8 and 4.9 mm after storing at 7° C. for 1 day and 2 weeks respectively. The measurement results with the texture analyzer were 139 and 153 grammes respectively after the said storage times. The pH fell from 4.15 after 1 day to 3.98 after 2 weeks. After 1 day the product had a smooth appearance and a very thick consistency. The product had the creamy, typical yoghurt taste. Both taste and consistency were maintained during the storage period. No separation of whey found.

EXAMPLE III

Preparation of yoghurt

As Example I except that the quantity of starting milk, the fat content and the fat-free dry solids content of the starting milk, the quantity of added skimmed milk powder, the temperature in the second heating step, the duration of the second heating step, the temperature to which the product is cooled, the amount of added microbiological culture, the stirring time and the incubation time are as indicated in the above Table B.

The coagulum was stirred loose with the aid of a spiral stirrer for 2 minutes at 60 revolutions per minute. During further processing the product was stirred slowly to maintain a homogeneous distribution. With the aid of a lifting pump (type Waukesha 10DO, delivery 90 liters per hour), the product was pumped through a rectangular channel made of stainless steel. The dimensions of the flow-through orifice of the rectangular channel, the pressure drop over the said channel and the temperature to which the product was cooled are given in the table. The pressure drop over the plate condenser was 50 KPA. The yoghurt, flowing with the aid of a lifting pump (type Waukesha, 3D0, delivery 30 liters per hour), was then cooled to 10° C. with the aid of a tube condenser and ice water at 2° C. The tube condenser consisted of two concentric tubes, each with a length of 2 m and the inner tube with a diameter of 25 mm. The cooled yoghurt was collected in plastic beakers, closed off with an aluminium capsule and stored at 7° C. The penetration depth, determined with the penetrometer, of this product was 18.3 and 13.7 mm after storing at 7° C. for 1 day and for 2 weeks respectively. The measurement results with the texture analyzer were 59 and 62 grammes respectively after the said storage times. The flow-through times were 34 and 45 seconds respectively. The pH fell from 4.04 after 1 day to 3.89 after 2 weeks. After 1 day the product had a smooth appearance and a good yoghurt consistency. The product had a creamy, typical yoghurt taste. Both taste and consistency were retained during the storage period. No separation of whey was found.

EXAMPLE IV

Preparation of yoghurt

As Example I except that the quantity of starting milk, the fat content of the starting milk, the quantity of added skimmed milk powder, the temperature in the second heating step, the duration of the second heating step, the temperature to which the product is cooled, the quantity of added microbiological culture, the stirring time, the incubation time and the pH after incubation are as indicated in the above Table B.

The coagulum was stirred loose with the aid of a spiral stirrer for 2 minutes at 60 revolutions per minute. During further processing the product was stirred slowly to maintain a homogeneous distribution. With the aid of a monopump (type SH 22R5, delivery 90 liters per hour), the product was pumped through two sieves. The first sieve consisted of a perforated plate with a diameter of 25 mX T provided with 42 circular perforations per cm3 with a diameter meter of 0.5 mm. The second sieve consisted of metal gauze with a diameter of 25 mm, with a mesh width of 0.4 mm and a wire thickness of 0.2 mm. The yoghurt, flowing with the aid of a lifting pump (type Waukesha 3DO, delivery 60 liters per hour), was then cooled to 18° C. with the aid of a plate condenser with ice water at 2° C. The product was collected in plastic beakers, closed off with an aluminium capsule and stored at 7° C.

The product had a flow-through time of 24 seconds after 1 day and a flow-through time of 23 seconds after 2 weeks. The pH fell from 4.05 after 1 day to 3.91 after 2 weeks. After 1 day the product had a smooth appearance and a good yoghurt consistency. The product had a good yoghurt taste and the typical yoghurt aroma. Both taste and consistency were retained during the storage period. No separation of whey was found.

EXAMPLE V

Preparation of yoghurt

As Example I except that the quantity of starting milk, the fat content and fat-free dry solids content of the starting milk, the quantity of added skimmed milk powder, the temperature in the second heating step, the duration of the second heating step, the temperature to which the product is cooled, the quantity of added microbiological culture, the stirring time, the incubation time and the pH after incubation are as indicated in the above Table B.

The coagulum was stirred loose with a spiral stirrer for 2 minutes at 60 revolutions per minute. During further processing the product was stirred slowly to maintain a homogeneous distribution. With the aid of a monopump (type 22R5, delivery 90 liters per hour), the product was pumped through a reducing valve. The pressure drop over the reducing valve is shown in the table. Using a lifting pump (type Waukesha 3DO, delivery 90 liters per hour), the yoghurt was then cooled to 10° C. via a plate condenser with ice water at 2° C. The cooled yoghurt was collected in plastic beakers, closed off with an aluminium capsule and stored at 7° C.

The flow-through times were 35 and 50 seconds respectively. The pH fell from 4.07 after 1 day to 3.93 after 2 weeks. After 1 day the product had a smooth appearance and a good yoghurt consistency. The product had a good yoghurt taste and the typical yoghurt aroma. Both taste and consistency were retained during the storage period. No separation of whey was found.

EXAMPLE VI

Preparation of yoghurt

As Example I except that the quantity of starting milk, the fat content and fat-free dry solids content of the starting milk, the quantity of added skimmed milk powder, the temperature in the second heating step, the duration of the second heating step, the temperature to which the product is cooled, the quantity of added microbiological culture, the stirring time, the incubation time and the pH after incubation are as indicated in the above Table B.

The coagulum was stirred loose with the aid of a spiral stirrer for 2 minutes at 50 revolutions per minute. During further processing the product was stirred slowly to maintain a homogeneous distribution. With the aid of a monopump (type SH 22R5, delivery 90 liters per hour), the product was pumped through a reducing valve. The pressure drop over the reducing valve is shown in the table. 50 liters of yoghurt were then cooled to 15° C. while flowing, with the aid of a plate condenser with ice water at 2° C. The other 50 liters yoghurt were cooled in the same way, but to 25° C. The pressure drop over the plate condenser was 75 KPA and 65 KPA respectively. The two-portions of yoghurt were then collected in plastic beakers, closed off with an aluminium capsule and cooled to 7° C. in a forced stream of air at 2° C.

The flow-through times of the portion of yoghurt pre-cooled to 15° C. while flowing were 40 and 41 seconds after 1 day weeks respectively. The pH of this portion of yoghurt fell from 4.08 after 1 day to 3.99 after 2 weeks. The flow-through times of the portion of yoghurt precooled to 25° C. while flowing were 48 and 48 seconds after 1 day and 2 weeks respectively. The pH of this portion of yoghurt fell from 4.11 after 1 day to 3.99 after 2 weeks. After 1 day both portions of yoghurt had a smooth appearance and a good yoghurt consistency. The product had a good yoghurt taste and the typical yoghurt aroma. Both taste and consistency were retained during the storage period. No separation of whey was found.

EXAMPLE VII

Preparation of yoghurt

As Example I except that the quantity of starting milk, the fat content and fat-free dry solids content of the starting milk, the quantity of added skimmed milk powder, the temperature in the second heating step, the duration of the second heating step, the temperature to which the product is cooled, the quantity of added microbiological culture, the stirring time, the incubation time and the pH after incubation are as indicated in the above Table B.

The coagulum was stirred loose with the aid of a spiral stirrer for 2 minutes at 50 revolutions per minute. During further processing, the product was stirred slowly to maintain a homogeneous distribution. With the aid of a monopump (type SH 22R5, delivery 90 liters per hour), the product was pumped through a reducing valve. The pressure drop over the reducing valve is shown in the table. The yoghurt was then cooled to 25° C., while flowing, with the aid of a plate condenser with ice water at 2° C. The pressure drop over the plate condenser was 65 KPA. One portion of yoghurt was then collected in plastic beakers, closed off with an aluminium capsule and cooled to 7° C. in a forced stream of air at 2° C. A second portion of yoghurt was cooled to 10° C., while flowing with the aid of a lifting pump (type Waukesha 3DO, delivery 30 liters per hour), via a tube condenser. This tube condenser consisted of two tubes, each with a length of 2 m and the inner tube with a diameter of 25 mm. This deep cooled yoghurt was collected in plastic beakers, closed off with an aluminium capsule and stored at 7° C.

The flow-through time of the first portion of yoghurt, which was deep cooled to 7° C. in a forced stream of air in the packaging, was 48 seconds after 1 day and 48 seconds after 2 weeks. The pH of this portion of yoghurt fell from 4.11 after 1 day to 3.99 after 2 weeks.

The flow-through times of the second portion of yoghurt, which was deep cooled to 10° C. while flowing, were 37 and 36 seconds after 1 day and after 2 weeks respectively. The pH of this portion of yoghurt fell from 4.13 after 1 day to 4.04 after 2 weeks. After 1 day both portions of yoghurt had a smooth appearance and a good yoghurt consistency. The product had a good yoghurt taste and the typical yoghurt aroma. Both taste and consistency were retained during the storage period. Some separation of whey was detected only in the case of the yoghurt deep cooled while flowing.

EXAMPLE VIII

Preparation of yoghurt

As Example I except that the quantity of starting milk, the fat content and fat-free dry solids content of the starting milk, the quantity of added skimmed milk powder, the temperature in the second heating step, the duration of the second heating step, the temperature to which the product is cooled, the quantity of added microbiological culture, the stirring time, the incubation time and the pH after incubation are as indicated in the above Table B.

The coagulum was stirred loose with the aid of a spiral stirrer for 2 minutes at 50 revolutions per minute. During further processing, the product was stirred slowly to maintain a homogeneous distribution. With the aid of a monopump (type SH 22R5, delivery 90 liters per hour), the product was pumped through a reducing valve. The pressure drop over the reducing valve is shown in the table. The yoghurt was then cooled to 25° C., while flowing, with the aid of a plate condenser with ice water at 2° C. The pressure drop over the plate condenser was 62 KPA. The yoghurt was then divided into two portions.

The first portion of yoghurt was collected in plastic beakers, closed off with an aluminium capsule and cooled to 7° C. in a forced stream of air at 2° C. The second portion of yoghurt was stored for five hours at 25° C. During this storage period the pH fell 0.1 pH unit. This portion of yoghurt was then collected in plastic beakers and closed off with an aluminium capsule and cooled to 7° C. in a forced stream of air at 2° C.

The flow-through times of the first portion of yoghurt, which after precooling to 25° C. was deep cooled to 7° C., were 48 seconds after 1 day and 48 seconds after 2 weeks. The pH of this portion of yoghurt fell from 4.11 after 1 day to 3.99 after 2 weeks. The flow-through times of the second portion of yoghurt, which after precooling to 25° C. while flowing was stored for 5 hours at 25° C., were 60 seconds after 1 day and 76 seconds after 2 weeks. The pH of this portion of yoghurt falls from 4.11 after 1 day to 3.99 after 2 weeks. After 1 day both portions of yoghurt had a smooth appearance and a good yoghurt consistency. The product had a good yoghurt taste and the typical yoghurt aroma. Both taste and consistency were retained during the storage period. No separation of whey was found.

EXAMPLE IX

Preparation of sour whipped cream

Fresh thin cream having a fat content of 35.8% by weight and a fat-free dry solids content of 5.7% by weight was warmed to 55° C. while flowing, homogenized under a pressure of 7.2 MPA, then pasteurized at 90° C., while flowing, with a residence time of 6 minutes and cooled to 6° C. while flowing. 100 liters of this cream were warmed to 21° C. in a double-walled tank, with stirring. 12.5 ml deep frozen mother rennet concentrate type A (NIZO), consisting of the acid forming bacteria S. lactis subsp. cremoris and S. lactis and the aroma substances S. lactis subsp. diacetylactis, L. mesenteroides subsp. cremoris and L. lactis, were added to this cream. Stirring was stopped when the added culture was uniformly distributed through the cream. The mixture was incubated at 21° C. After 21 hours a pH of 4.58 was reached, after which the product was stirred with the aid of a spiral stirrer for 5 minutes at 60 revolutions per minute. The stirred product did not have a smooth structure.

With the aid of a monopump (type SH 22R5, delivery 90 liters per hour) the product was pumped through a rectangular channel made of stainless steel. The dimensions of the flow-through orifice of the rectangular channel were: width 0.2 mm, height 25 mm with a length of 25 mm. The pressure drop over the said channel was 600 KPA. The structured product had a smooth structure. The product was then collected in 150 ml plastic beakers, closed off with an aluminium capsule and cooled to 7° C. in a forced stream of air at 2° C.

After storing at 7° C. for 1 day and for 2 weeks, the firmness of the sour whipped cream was measured at the storage temperature with the aid of a penetrometer and a Stephens FLRA Texture Analyser. The pH was also measured and the product was assessed organoleptically at these times. With the penetrometer, manufacture Sommer and Runge, the penetration depth of a conical, aluminium measuring body (the penetration point had an angle of 60 degrees, total mass 87.2 grammes) over 10 seconds was determined. With the texture analyzer the weight was determined which was necessary to move a plastic measuring body (diameter 24 mm, height 35 mm) at a speed of 2 mm per second over a distance of 20 mm.

The penetration depth, determined with the penetrometer, of this product was 22.2 and 20.2 mm respectively after storing at 7° C. for 1 day and for 2 weeks. The measurement results with the texture analyzer were 212 and 214 grammes respectively after the said storage times. The pH fell from 4.4 after 1 day to 4.3 after 2 weeks. After 1 day the product had a smooth appearance and a very thick, smooth consistency. The product had the creamy, fresh-sour and aromatic taste. Both taste and consistency were retained during the storage period. No separation of whey on the product surface was detected.

EXAMPLE X

Preparation of sour cream

Fresh, thin cream, having a fat content of 22.7% by weight and a fat-free dry solids content of 6.9% by weight was warmed to 55° C., while flowing, homogenized under a pressure of 15 MPA, then pasteurized at 90° C., while flowing, with a residence time of 6 minutes and cooled to 6° C. while flowing. 70 liters of this cream were warmed to 21° C. in a double-walled tank, with stirring. 8.75 ml deep frozen mother rennet concentrate type A (NIZO), consisting of the acid forming bacteria S. lactis subsp. cremoris and S. lactis and the aroma-forming agents S. lactis subsp. diacetylactis, L. mesenteroides subsp. cremoris and L. lactis, were added to this cream. Stirring was stopped when the added culture was uniformly distributed through the cream. The mixture was incubated at 21° C. After 20 hours a pH of 4.62 was achieved, after which the product was stirred with the aid of a wicket stirrer for 1 minute at 40 revolutions per minute. The stirred product had a reasonably smooth structure but still showed a few white points.

With the aid of a monopump (type SH 22R5, delivery 164 liters per hour), the product was pumped through a rectangular channel made of stainless steel. The dimensions of the flow-through orifice of the rectangular channel were: width 0.4 mm, height 25 mm with a length, of 50 mm. The pressure drop over the said channel was 300 KPA. The, structured product had a smooth structure. The product was then collected in 150 ml plastic beakers, closed off with an aluminium capsule and cooled to 7° C. in a forced stream of air at 2° C.

After storing at 7° C. for 1 day and for 2 weeks the firmness of the sour cream was measured at the storage temperature with the aid of a penetrometer and a Stephens FLRA Texture Analyser. The pH was also measured and the product was assessed organoleptically at these times. With the penetrometer, manufacturer Sommer and Runge, the penetration depth of a conical, aluminium measuring body (the penetration point had an angle of 60 degrees, total mass 87.2 grammes) over 10 seconds was determined. With the texture analyzer the weight was determined which was needed to move a plastic measuring body (diameter 24 mm, height 35 mm) at a rate of 2 mm per second over a distance of 20 mm.

The penetration depth, determined with the penetrometer, of this product was 33.4 and 29.3 mm respectively after storing at 7° C. for 1 day and for 2 weeks. The measurement results with the texture analyzer were 80 and 96 grammes respectively after the said storage times. The pH fell from 4.4 after 1 day to 4.3 after 2 weeks. After 1 day the product had a smooth appearance and a thick, smooth consistency. The product had the creamy, fresh-sour and aromatic taste. Both taste and consistency were retained during the storage period. No separation of whey on the product surface was detected.

EXAMPLE XI

Preparation of sour single cream

Fresh thin cream having a fat content of 10.1% by weight and a fat-free dry solids content of 8.0% by weight was warmed to 55° C., while flowing, homogenized under a pressure of 20 MPA, then pasteurized at 90° C., while flowing, with a residence time of 6 minutes and cooled to 6° C. while flowing. 100 liters of this cream were warmed to 21° C. in a double-walled tank, with stirring. 12.5 ml of lyophilized mother rennet concentrate type A (NIZO), consisting of the acid forming bacteria S. lactis subsp. cremoris and S. lactis and the aroma forming substances S. lactis subsp. diacetylactis, L. mesenteroides subsp. cremoris and L. lactis, were added to this cream. Stirring was stopped when the added culture was uniformly distributed through the cream.

The mixture was incubated at 21° C. After 24 hours a pH of 4.52 was reached, after which the product was stirred with the aid of a spiral stirrer for 5 minutes at 60 revolutions per minute. The stirred product had a very coarse structure and showed many lumps.

With the aid of a monopump (type SH 22R5, delivery 90 liters per hour), the product was pumped through a rectangular channel made of stainless steel. The dimensions of the flow-through orifice of the rectangular channel were: width 0.2 mm, height 25 mm with a length of 25 mm. The pressure drop over the said channel was 200 KPA. The structured product had a smooth structure. The product was then collected in 150 ml plastic beakers, closed off with an aluminium capsule and cooled to 7° C. in a forced stream of air at 2° C.

After storing at 7° C. for 1 day and for 2 weeks the firmness of the sour single cream was measured at the storage temperature with the aid of a Stephens FLRA Texture Analyser. The pH was also measured and the product was assessed organoleptically at these times. With the texture analyzer the weight was determined which was needed to move a plastic measuring body (diameter 24 mm, height 35 mm) at a rate of 2 mm per second over a distance of 20 mm.

The measurement results with the texture analyzer were 40 and 53 grammes respectively after storing at 7° C for 1 day and for 2 weeks. The pH fell from 4.4 after 1 day to 4.3 after 2 weeks. After 1 day the product had a smooth appearance and a smooth consistency. The product had the creamy, fresh-sour and aromatic taste. Both taste and consistency were retained during the storage period. No separation of whey on the product surface was detected.

EXAMPLE XII

Preparation of yoghurt

Fresh milk having a fat content of 2.95% by weight, to which 1.0% by weight skimmed milk powder had been added, was warmed to 65° C., while flowing, homogenized under a pressure of 20 MPA, then pasteurized at 76° C., while flowing, with a residence time of 20 seconds, and cooled to 6° C. while flowing. The following day 50 liters of said milk were warmed to 90° C. in a double-walled tank, with stirring, kept at this temperature for 10 minutes and then cooled to 44° C. 1.35 liters fresh, non-slime-producing yoghurt culture consisting of L. delbrueckii subsp. bulgaricus and S. thermophilus were added to this milk and the mixture was stirred for 1 minute to obtain a homogeneous distribution of the bacteria. The mixture was incubated at 43° C.

After 2.8 hours a pH of 4.46 was achieved, after which the coagulum was stirred loose with the aid of a spiral stirrer for 2 minutes at 75 revolutions per minute. During further processing the product was stirred slowly to maintain a homogeneous distribution. With the aid of a monopump (type SH 22R5, delivery 90 liters per hour), the product was pumped through two sieves. The first sieve consisted of a perforated plate with a diameter of 25 mm, provided with 42 circular perforations per cm2, with a diameter of 0.55 mm. The second sieve consisted of metal gauze with a diameter of 25 mm with a mesh width of 0.4 mm and a wire thickness of 0.2 mm. With the aid of a lifting pump (type Waukesha 3DO, delivery 90 liters per hour), the yoghurt was then cooled to 18° C., while flowing, with the aid of a plate condenser with ice water at 2° C. The product was collected in plastic beakers, closed off with an aluminium capsule and stored at 7° C. Further cooling to 7° C. took place in a forced stream of air at 2° C. After storing at 7° C. for 1 day and for 2 weeks, the flow-through time of the yoghurt was measured at the storage temperature with the aid of a Posthumus funnel with an outlet orifice with a diameter of 8 mm. The pH was also measured and the product was assessed organoleptically at these times.

The product had a flow-through time of 46 seconds after 1 day and a flow-through time of 66 seconds after 2 weeks. The pH fell from 4.12 after 1 day to 3.99 after 2 weeks. After 1 day the product had a smooth appearance and a good yoghurt consistency. The product had a good yoghurt taste and the typical yoghurt aroma. Both taste and consistency were retained during the storage period. No separation of whey was found.

EXAMPLE XIII

Consumer test with low fat yoghurt and full fat yoghurt

The acceptance of low fat yoghurt, such as described in Example IV, and full fat yoghurt, such as described in Example XII, by the Dutch consumer was investigated.

The investigation was carried out by means of 300 individual, structured interviews. Half of those tested were given low fat yoghurt and the other half of those tested were given full fat yoghurt.

A summary of the consumer tests is given below.
Paragraph 1

SUMMARY 1.1. On the basis of the draft, description a positive, reaction is obtained; a thick, old fashioned and tasty yoghurt is expected. In particular the concept of "thick" is frequently mentioned.

1.2 On the basis of this draft description it is expected that this new yoghurt is considerably thicker than the existing yoghurts and will have a somewhat milder (also less sour) taste.

1.3 The interest on the basis of the appearance of the yoghurt and the draft description is great. Interest is shown by 84% for the full fat yoghurt and even by 90% for the low fat yoghurt.

1.4 Both the whole yoghurt and the low fat yoghurt look attractive. 74% think that the whole yoghurt looks (very) attractive; the corresponding figure for the low fat yoghurt is 80%.

1.5 Both products were found to taste good. No fewer than some 87% think the yoghurt tastes good. The only adverse comment is that both products are somewhat too sour.

1.6 About 2 in every 5 participants take "ordinary yoghurt" as the reference point. The other participants also compare the new yoghurt with, for example, cottage cheese, Bulgarian yoghurt and Biogarde ®.

EXAMPLE XIV

Preparation of fruit yoghurt

Fresh milk having a fat content of 3.06% by weight, to which 1% by weight of skimmed milk powder had been added, was warmed to 65° C., while flowing, homogenized under a pressure of 20 MPA, then pasteurized at 76° C., while flowing, with a residence time of 20 seconds, and cooled to 6° C., while flowing. The following day 90 liters of this milk were warmed to 90° C. in a double-walled tank, with stirring, then kept hot at this temperature for 10 minutes and cooled to 44° C. 2.25 liters fresh, non-slime-producing yoghurt culture, consisting of L. delbrueckii subsp. bulgaricus and S. thermophilus, were added to this milk and the mixture was stirred for 5 minutes to achieve a homogeneous distribution of the bacteria. The mixture was incubated at 43° C. After 3.25 hours a pH of 4.24 was obtained, after which the coagulum was stirred loose with the aid of a spiral stirrer for 2 minutes at 60 revolutions per minute. During further processing, the product was stirred slowly to achieve a homogeneous distribution. With the aid of a monopump (type SH 22R5, delivery 90 liters per hour), the product was pumped through two sieves. The first sieve consisted of a perforated plate with a diameter of 25 mm provided with 42 circular perforations per cm2 with a diameter of 0.55 mm. The second sieve consisted of metal gauze with a diameter of 25 mm, with a mesh width of 0.4 mm and a wire thickness of 0.2 mm. With the aid of a lifting pump (type Waukesha 3DO, delivery 90 liters per hour), the yoghurt was then cooled to 20° C., while flowing, with the aid of a plate condenser with ice water at 2° C. Subsequently the yoghurt was cooled to 12° C., while flowing, with the aid of a tube condenser and ice water at 2° C. The tube condenser consisted of a tube with a length of 3 m and a diameter of 25 mm. The cooled yoghurt was mixed with a strawberry fruit preparation (mixing ratio 78:22), collected in plastic beakers, closed off with an aluminium capsule and stored at 7° C. The pH fell from 4.1 to 4.0 as a result of the addition of the strawberry fruit preparation.

After storing at 7° C. for 2 days and for 2 weeks, the fruit yoghurt was measured, after sieving out the fruit parts, at the storage temperature with the aid of a height-adjusted Posthumus funnel with an outlet orifice with a diameter of 8 mm. The pH was also measured and the product was assessed organoleptically at these times.

The flow-through times through the Posthumus funnel were 30 and 55 seconds respectively after storing at 7° C. for 2 days and for 2 weeks. The pH fell from 4.0 after 2 days to 3.9 after 2 weeks. After 2 days the product had a smooth appearance and a good consistency for fruit yoghurt. In addition to a good yoghurt taste and the typical yoghurt aroma, the product had an excellent strawberry taste. Both taste and consistency were retained during the storage period. No separation of whey was found.

The following tests were carried out to demonstrate the controllability of the process by means of shearing force or energy dissipation.

EXAMPLE XV

Preparation of yoghurt

Fresh milk having a fat content of 2.96 % by weight, to which 1% by weight of skimmed milk powder had been added, was warmed to 65° C., while flowing, homogenized under a pressure of 20 MPA, then pasteurized at 92° C., while flowing, with a residence time, of 6 minutes, and cooled to 6° C., while flowing. The following day 65 liters of this milk were warmed to 44° C. in a double-walled tank, with stirring. 1.625 liters of fresh non-slime-producing yoghurt culture, consisting of L. delbrueckii subsp. bulgaricus and S. thermophilus, were added to this milk and the mixture was stirred for 5 minutes to obtain a homogeneous distribution of the bacteria. The mixture was incubated at 43° C. After 4 hours a pH of 4.30 was obtained, after which the coagulum was stirred loose with the aid of a wicket stirrer for 2 minutes at 60 revolutions per minute. During further processing the product was stirred slowly in order to maintain a homogeneous distribution. With the aid of a monopump (type SH 22R5, delivery 90 liters per hour), the product was pumped through a reducing valve, with which the pressure drop over the reducing valve was set to various values (see Table B). The yoghurt was then cooled to 20° C., while flowing, with the aid of a plate condenser with ice water at about 2° C. The cooled yoghurt was collected in plastic beakers, closed off with an aluminium capsule, cooled in a forced stream of cold air and stored at 7° C.

After storing at 7° C. for 1 day and for 2 weeks, the firmness of the yoghurt at the storage temperature was measured with the aid of a penetrometer and the flow-through time was measured with the aid of a Posthumus funnel with an outlet orifice with a diameter of 8 mm. The pH was also measured and the product was assessed organoleptically for appearance, serum separation and viscosity at these times. Using the penetrometer, manufacturer Sommer and Runge, the penetration depth of a plastic measuring body (diameter 38 mm, height 20 mm, mass 27 grammes) over 10 seconds was determined.

The results of the measurements and organoleptic assessment are summarized in Table C.

TABLE C

| structuring unit | delta P kPa | firmness penetrometer (mm) | | flow time Posthumus funnel (sec) | | pH | | judgement smoothness | | judgement viscosity | |
|---|---|---|---|---|---|---|---|---|---|---|---|
| | | after 1 day | after 2 weeks | after 1 day | after 2 weeks | after 1 day | after 2 weeks | after 1 day | after 2 weeks | after 1 day | after 2 weeks |
| reducing valve | 0 | 17,3 | 15,0 | 58 | 83 | 4,11 | 3,95 | a lot of small lumps | a lot of small lumps | | |
| reducing valve | 25 | 16,5 | 17,5 | 49 | 50 | 4,20 | 4,01 | smooth | smooth | a thick fluid | a thick fluid |
| reducing valve | 50 | 17,5 | 18,9 | 44 | 45 | 4,11 | 3,98 | smooth | smooth | a thick fluid | a thick fluid |

TABLE C-continued

| structuring unit | delta P kPa | firmness penetrometer (mm) | | flow time Posthumus funnel (sec) | | pH | | judgement smoothness | | judgement viscosity | |
|---|---|---|---|---|---|---|---|---|---|---|---|
| | | after 1 day | after 2 weeks | after 1 day | after 2 weeks | after 1 day | after 2 weeks | after 1 day | after 2 weeks | after 1 day | after 2 weeks |
| reducing valve | 75 | 18,8 | 24,8 | 37 | 30 | 4,07 | 3,95 | very smooth | very smooth | a thick fluid | a thick fluid |

It can be seen from these results that it was possible to change the viscosity and smoothness of the product by choosing a different pressure drop over the reducing valve.

All products had a good yoghurt taste and the typical yoghurt aroma. Both taste and consistency were retained during the storage period. No separation of whey was found.

EXAMPLE XVI

Preparation of Biogarde ®

Fresh milk having a fat content of 2.90% by weight, to which 1% by weight skimmed milk powder had been added, was warmed to 65° C., while flowing, homogenized under a pressure of 20 MPA, then pasteurized at 92° C., while flowing, with a residence time of 6 minutes, and cooled to 6° C., while flowing. 120 liters of this milk were warmed to 39° C. in a double-walled tank, with stirring. 1 3.6 liters fresh Biogarde ® culture, consisting of L. acidophilus, B. bifidum and S. thermophilus, were added to this milk and the mixture stirred for 5 minutes to obtain a homogeneous distribution of the bacteria. The mixture was incubated at 38° C. After 13.25 hours a pH of 4.39 was obtained, after which the coagulum was stirred loose with the aid of a spiral stirrer for 2 minutes at 60 revolutions per minute. During further processing the product was stirred slowly to maintain a homogeneous distribution. With the aid of a lifting pump (type Waukesha 10DO, delivery 90 liters per hour), the product was pumped through various rectangular channels made of stainless steel or pumped through a reducing valve, the pressure drop over the reducing valve being set to 50 KPA. The dimensions of the flow-through orifice of the rectangular channels are given in Table D.

The product was then cooled to about 20° C., while flowing, with the aid of a plate condenser with ice water at about 2° C. The product was collected in plastic beakers, closed off with an aluminium capsule and stored at 7° C. Further cooling to 7° C. took place in a forced stream of air at 2° C.

After storing at 7° C. for 1 day and for 2 weeks, the firmness of the product at the storage temperature was measured with the aid of a penetrometer and the flow-through time was measured with the aid of a Posthumus funnel with an outlet orifice with a diameter of 8 mm. The pH was also measured and the product was assessed organoleptically for appearance, serum separation and viscosity at these times.

Using the penetrometer, manufacturer Sommer and Runge, the penetration depth of a plastic measuring body (diameter 38 mm, height 20 mm, mass 27 grammes) over 10 seconds was determined.

The results of the measurements and organoleptic assessment are likewise given in Table D.

It can be seen from this table that it is possible to influence the appearance and the viscosity by varying the dimensions of the rectangular channel.

EXAMPLE XVII

Preparation of sour whipped cream

Fresh, thin cream having a fat content of 35.8% by weight and a fat-free dry solids content of 5.7% by weight was warmed to 55° C., while flowing, homogenized under a pressure of 7.2 MPA, the pasteurized at 90° C., while flowing, with a residence time of 6 minutes, and cooled to 6° C., while flowing. 100 liters of this cream were warmed to 21° C. in a double-walled tank, with stirring. 12.5 ml lyophylized mother rennet concentrate type A (NIZO), consisting of the acid forming S. lactis subsp. cremoris and S. lactis and the aroma-forming substances S. lactis subsp. diacetylactis, L. mesenteroides subsp. cremoris and L. lactis, were added to this cream. Stirring was stopped when the added culture was uniformly distributed through the cream. The mixture was incubated at 21° C. After 21 hours a pH of

TABLE D

| structuring unit | delta P kPa | firmness penetrometer (mm) | | flow time Posthumus funnel (sec) | | pH | | judgement smoothness | | judgement viscosity | |
|---|---|---|---|---|---|---|---|---|---|---|---|
| | | after 1 day | after 2 weeks | after 1 day | after 2 weeks | after 1 day | after 2 weeks | after 1 day | after 2 weeks | after 1 day | after 2 weeks |
| reducing valve | 50 | 15,5 | 12,6 | 39 | 71 | 4,18 | 4,12 | smooth | smooth | thick fluid | very thick fluid |
| Channel B:L:H: 0,2:15:25 mm | 74 | 17,5 | 18,3 | 27 | 48 | 4,21 | 4,19 | smooth | smooth | thick fluid | thick fluid |
| Channel B:L:H: 0,2:25:25 mm | 106 | 16,8 | 15,0 | 34 | 53 | 4,20 | 4,18 | smooth | smooth | thick fluid | thick fluid |
| Channel B:L:H: 0,4:30:25 mm | 53 | 18,0 | 16,5 | 25 | 55 | 4,25 | 4,19 | smooth some small lumps | almost smooth | thick fluid | thick fluid |
| Channel B:L:H: 0,4:50:25 mm | 72 | 15,8 | 14,4 | 43 | 61 | 4,19 | 4,11 | coarse small lumps | very coarse small lumps | thick fluid | very thick fluid |
| Channel B:L:H: 0,6:45:25 mm | 32 | 15,4 | 12,5 | 43 | 70 | 4,19 | 4,12 | very coarse small lumps | very coarse small lumps | thick fluid | very thick fluid |
| Channel B:L:H: 0,6:75:25 mm | 72 | 15,5 | 12,4 | 39 | 76 | 4,19 | 4,12 | very coarse small lumps | very coarse small lumps | thick fluid | very thick fluid |

4.58 was obtained, after which the product was stirred with the aid of a spiral stirrer for 5 minutes at 60 revolutions per minute. The stirred product did not have a smooth structure.

With the aid of a monopump (type SH 22R5), the product was pumped through diverse rectangular channels made of stainless steel or pumped through two sieves, as described in Example IV. The dimensions of the flow-through orifice of the rectangular channel are given in Table E, as is the pressure drop over said channels.

the added microbiological culture, the quantity of added micro-biological culture, the stirring time, the incubation time and the pH after incubation are as indicated in the appended table.

The coagulum was stirred loose with a spiral stirrer for 2 minutes at 60 revolutions per minute. During further processing the product was stirred slowly to maintain a homogeneous distribution. With the aid of a lifting pump (type Waukesha 10DO, delivery 90 liters per hour), the product was pumped through a rectangular channel made of stainless steel. The dimensions of the

TABLE E

| structuring unit | delta P kPa | debiet (1 hour) | firmness penetrometer (mm) na 1 dag 1 day | firmness penetrometer (mm) na 2 wkn 2 weeks | firmness Texture Analyser (mm) na 1 dag 1 day | firmness Texture Analyser (mm) na 2 wkn 2 weeks | pH na 1 dag 1 day | pH na 2 wkn 2 weeks | judgement appearance na 1 dag 1 day | judgement appearance na 2 wkn 2 weeks |
|---|---|---|---|---|---|---|---|---|---|---|
| none | — | 90 | 27,7 | 25,2 | 144 | 146 | 4,40 | 4,30 | very coarse white points, unctuous | very coarse white points, unctuous |
| double sieve | 10 | 90 | 21,2 | 19,2 | 243 | 243 | 4,40 | 4,30 | almost smooth very unctuous | almost smooth very unctuous |
| channel B:L:H: 0,2:15:25 mm | 600 | 90 | 22,2 | 20,1 | 212 | 218 | 4,40 | 4,30 | smooth very unctuous | smooth very unctuous |
| channel B:L:H: 0,2:15:25 mm | 850 | 150 | 21,5 | 20,5 | 199 | 205 | 4,40 | 4,30 | smooth very unctuous | smooth very unctuous |
| channel B:L:H: 0,4:50:25 mm | 400 | 81 | 24,0 | 22,4 | 150 | 158 | 4,40 | 4,30 | smooth some points unctuous | smooth some points unctuous |
| channel B:L:H: 0,4:50:25 mm | 800 | 250 | 25,4 | 22,3 | 147 | 174 | 4,40 | 4,30 | smooth some points unctuous | almost smooth some points unctuous |
| channel B:L:H: 0,6:75:25 mm | 250 | 90 | 24,9 | 22,9 | 166 | 176 | 4,40 | 4,30 | smooth some points unctuous | smooth some points unctuous |
| channel B:L:H: 0,6:75:25 mm | 720 | 486 | 24,8 | 21,8 | 168 | 174 | 4,40 | 4,30 | smooth some | smooth some |

After structuring, the product was collected in 150 ml plastic beakers, closed off with an aluminium capsule and cooled to 7° C. in a forced stream of air at 2° C.

After storing at 7° C. for 1 day and for 2 weeks, the firmness of the sour whipped cream was measured at the storage temperature with the aid of a penetrometer and a Stephens FLRA Texture Analyser. The pH was also measured and the product was assessed organoleptically for appearance at these times. Using the penetrometer, manufacturer Sommer and Runge, the penetration depth of a conical, aluminium measuring body (the penetration point had an angle of 60 degrees, total mass 87.2 grammes) over 10 seconds was determined. With the texture analyzer the weight was determined which was necessary to move a plastic measuring body (diameter 24 mm, height 35 mm) at a rate of 2 mm per second over a distance of 20 mm.

The results of the measurements and organoleptic assessment after storing at 7° C. for 1 day and for 2 weeks are given in TABLE E.

EXAMPLE XVIII

Preparation of Biogarde ®

As Example I except that the quantity of starting milk, the fat content and the fat-free dry solids content of the starting milk, the quantity of added skimmed milk powder, the temperature in the second warming step, the duration of the second warming step, the temperature to which the product is cooled, the components of flow-through orifice of the rectangular channel, the pressure drop and the temperature to which the product was cooled are indicated in the table. The pressure drop over the plate condenser was 55 KPA. The product was collected in plastic beakers, closed off with an aluminium capsule and stored at 7° C. Further cooling to 7° C. took place in a forced stream of air at 2° C.

The penetration depth, determined with the penetrometer, of this product, was 16.8 and 15.0 mm respectively after storing at 7° C. for 1 day and for 2 weeks. The measurement results with the texture analyzer were 66 and 73 grammes respectively after the said storage times. The flow-through times were 34 and 53 seconds respectively. The pH fell from 4.20 after 1 day to 4.18 after 2 weeks. After 1 day the product had a virtually smooth appearance and a good consistency. The product had a creamy and typical Biogarde ® taste. Both taste and consistency were retained during the storage period. No separation of whey was found.

We claim:
1. A method for the structuring of fermented milk products, comprising the steps of;
   a) standardizing the fat and dry solids content of a quantity of starting milk to a fat content of at least 1 to 40% by weight, to yield a quantity of standardized milk which depending on the fat content may or may not contain added fat-free dry milk solids;
   b) pasteurizing said quantity of standardized milk;

c) adding to said quantity of standardized milk mixed cultures of micro-organisms in liquid, frozen or deep-frozen form;

d) incubating, in the absence of binders formed by slime-forming lactic acid bacteria, the milk resulting from step c) for a predetermined period in a temperature range which is suitable for aroma development and coagulum formation by the micro-organisms, said absence of binders being assured even when optional slime-forming bacteria are present in said mixed cultures by selection of an incubation temperature at which slime formation for said optional slime forming bacteria is minimal;

e) subjecting the milk resulting from step d) to a controllable shearing force or energy dissipation by passing the milk through a reducing valve, feeding the milk through at least one channel, feeding the milk through at least one sieve, or feeding the milk through a pipeline wherein a rotating stirrer is located; and f) cooling the milk resulting from step e) to 10° C. or below and filling containers with the milk so cooled;

whereby a product results in which a slightly viscous characteristic changes to a highly viscous characteristic after a period of standing.

2. Method according to claim 1, wherein the controllable shearing force is obtained by allowing the milk to pass through a reducing valve.

3. Method according to claim 1, wherein the controllable shearing force is achieved by feeding the milk through at least one channel.

4. Method according to claim 1, wherein the controllable shearing force is achieved by feeding the milk product through at least one sieve.

5. Method according to claim 1, wherein the controllable shearing force is achieved by feeding the milk through a pipeline in which a rotating stirrer is located.

6. Method according to claim 1, wherein cooling of step f) takes place in a cooling tunnel.

7. Method according to claim 1, wherein the milk is first cooled to 20 C. using a heat exchanger.

8. Method according to claim 1, wherein the milk is cooled using a tube condenser.

9. Method according to claim 1, wherein said product has a fat content of 1 to 10% by weight.

10. Method according to claim 1, wherein said product has a fat content of 1 to 10% by weight and fruit added therein.

11. Method according to claim 1, wherein said product is a sour cream having a fat content of at least 10% by weight.

12. Method according to claim 1, wherein sour cream having a fat content of at least 10% by weight is prepared to which fruit is added.

13. Method according to claim 1, wherein fermented, structured products are prepared using the micro-organisms *L. acidophilus, B. bifidum* and *S. thermophilus.*

14. The product prepared according to the method of claim 1.

* * * * *

UNITED STATES PATENT AND TRADEMARK OFFICE
CERTIFICATE OF CORRECTION

PATENT NO. : 5,037,660                          Page 1 of 4

DATED    : August 6, 1991

INVENTOR(S) : Franciscus M. Driessen, Petrus B. G. Kluts and Jacob Knip

It is certified that error appears in the above-identified patent and that said Letters Patent is hereby corrected as shown below:

On the title page : Item [75]
   after Inventors: "Francisus" should read
--Franciscus--.

and  Item [56]
under References Cited OTHER PUBLICATIONS "Journ. of Diary sci." should read --Journ. of Diary Sci.--

Column 3 Line 44 after "particular" insert --micro-organisms--.

Column 3 Line 67 "are" should read --is--.

Column 4 Lines 18-19 after "caseinates" delete --not only the totally fat-free dry milk solids but also caseinates--.

Column 4 Line 41 "fat-free" should read --(fat-free--.

Column 5 Line 7 after "MPA" insert --and--.

Column 6 Line 18 "(he" should read --the--.

Table B, under SNF in weight %, lines 1, 2, 3, 6, 7, 8, 9 and 10 "7" should read --?--

UNITED STATES PATENT AND TRADEMARK OFFICE
CERTIFICATE OF CORRECTION

PATENT NO. : 5,037,660                   Page 2 of 4

DATED : August 6, 1991

INVENTOR(S) : Franciscus M. Driessen, Petrus B. G. Kluts and Jacob Knip

It is certified that error appears in the above-identified patent and that said Letters Patent is hereby corrected as shown below:

Table B, under Incubation period at chilling temperature in hours, line 1 add --7--.

Table B, under dP kPa, line IV "7" should read --?--.

After Table B, lines (1) and (2) after "25" (last occurrences) insert --mm--.

Column 8 Line 32 "mX T provided" should read --mX T provided--.

Column 8 Line 33 after "diameter" delete --meter--.

Column 9 Line 36 before "yoghurt" insert --of--.

Column 9 Line 44 after "day" insert --and 2--.

Column 11 Line 4 after "deep cooled" insert --directly--.

Column 11 Line 31 after "aroma" insert --forming--.

UNITED STATES PATENT AND TRADEMARK OFFICE
CERTIFICATE OF CORRECTION

PATENT NO. : 5,037,660

DATED : August 6, 1991

INVENTOR(S) : Franciscus M. Driessen, Petrus B. G. Kluts and Jacob Knip

It is certified that error appears in the above-identified patent and that said Letters Patent is hereby corrected as shown below:

Column 12 Line 37 "The," should read --The--.

Column 14 Line 49 "draft," should read --draft--.

Column 16 Line 11 after "dissipation" insert --, as described in Claim 2--.

Column 17 Line 28 "1 3.6" should read --3.6--.

Column 18 Line 36 "the" should read --then--.

Column 18 Line 42 after "forming" insert --bacteria--.

Table E, under judgement appearance, last lines after "some" insert --points unctuous--.

Claim 1 Line 62 Column 20 "of;" should read --of:--.

UNITED STATES PATENT AND TRADEMARK OFFICE
CERTIFICATE OF CORRECTION

PATENT NO. : 5,037,660

DATED : August 6, 1991

INVENTOR(S) : FRANCISCUS M. DRIESSEN, PETRUS B. G. KLUTS AND JACOB KNIP

It is certified that error appears in the above-identified patent and that said Letters Patent is hereby corrected as shown below:

Claim 4, column 22, lines 5-6 after "milk" delete --product --.

Calim 7, column 22, line 13, "20C." should read --20'C. --.

Signed and Sealed this

Seventh Day of December, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,037,660                                    Page 1 of 3
DATED      : August 6, 1991
INVENTOR(S) : Franciscus M. Driessen and Petrus B. G. Kluts and Jacob Knip

It is certified that error appears in the above-indentified patent and that said Letters Patent is hereby corrected as shown below:

Title page, item [75] Inventors:, "Francisus" should read --Franciscus--;

under, References Cited, OTHER PUBLICATIONS, in the J. Rasic et al. reference, "Diary" should read --Dairy--; and "Journ. of Dairy sci." should read --Journ. of Dairy Sci.--.

Column 3 Line 44 after "particular" insert --micro-organisms,--.

Column 3 Line 67 "are" should read --is--.

Column 4 Lines 18-19 after "caseinates" delete "not only the totally fat-free dry milk solids but also caseinates".

Column 4 Line 41 "fat-free" should read --(fat-free--.

Column 5 Line 8 before "then" insert --and--.

Column 6 Line 18 "(he" should read --the--.

Table B, under the heading SNF in weight %, lines 1, 2, 3, 6, 7, 8, 9 and 10, "7" should read --?--.

Table B, under the heading Incubation period at chilling temperature in hours, line 1, add --7--.

UNITED STATES PATENT AND TRADEMARK OFFICE
CERTIFICATE OF CORRECTION

PATENT NO. : 5,037,660

DATED : August 6, 1991

INVENTOR(S) : Franciscus M. Driessen and Petrus B. G. Kluts and Jacob Knip

It is certified that error appears in the above-indentified patent and that said Letters Patent is hereby corrected as shown below:

Table B, under the heading dP kPa, Example IV, "7" should read --?--.

After Table B, lines (1) and (2), after "25" (last occurrences) insert --mm--.

Column 8 Line 32 "mX T provided" should read --m$X^\wedge$ T provided--.

Column 8 Line 33 after "diameter" delete "meter".

Column 9 Line 36 before "yoghurt" insert --of--.

Column 9 Line 44 after "day" insert --and 2--.

Column 11 Line 4 after "deep cooled" insert --directly--.

Column 11 Line 31 after "aroma" insert --forming--.

Column 12 Line 37 "The," should read --The--.

Column 14 Line 49 "draft," should read --draft--.

UNITED STATES PATENT AND TRADEMARK OFFICE
CERTIFICATE OF CORRECTION

PATENT NO. : 5,037,660
DATED : August 6, 1991
INVENTOR(S) : Franciscus M. Driessen and Petrus B. G. Kluts and Jacob Knip It is certified that error appears in the above-indentified patent and that said Letters Patent is hereby corrected as shown below:

Column 16 Line 11 after "dissipation" insert --, as described in Claim 2--.

Column 17 Line 28 "1 3.6" should read --3.6--.

Column 18 Line 36 "the" should read --then--.

Column 18 Line 41 after "forming" insert --bacteria--.

Table E, under the heading judgement appearance, last lines, after "some" insert --points unctuous--.

Claim 1 Line 62 Column 20 "of;" should read --of:--.

Claim 4 Lines 5-6 Column 22 after "milk" delete "product".

Claim 7 Line 13 Column 22 "20 C." should read --20°C.--.

This certificate supersedes Certificate of Correction issued December 7, 1993.

Signed and Sealed this

Fourteenth Day of June, 1994

Attest:

BRUCE LEHMAN

Attesting Officer

Commissioner of Patents and Trademarks